United States Patent [19]
Dawson et al.

[11] Patent Number: 5,170,431
[45] Date of Patent: Dec. 8, 1992

[54] ELECTRONIC BOLT LOCK WITH ENHANCED SECURITY FEATURES

[75] Inventors: Gerald L. Dawson, Lexington; Daniel L. Thompson, Paris, both of Ky.

[73] Assignee: Mas-Hamilton Group, Newtown Circle, Ky.

[21] Appl. No.: 763,119

[22] Filed: Sep. 20, 1991

[51] Int. Cl.⁵ .............................................. H04K 1/00
[52] U.S. Cl. ........................................ 380/23; 380/52
[58] Field of Search ...................... 380/23, 52; 70/63

[56] References Cited

U.S. PATENT DOCUMENTS

| Re. 29,259 | 6/1977 | Sabsay | 380/23 |
|---|---|---|---|
| 3,821,704 | 6/1974 | Sabsay | 380/23 |
| 4,207,555 | 7/1980 | Trombly | 235/382.5 |
| 4,213,118 | 7/1980 | Genest et al. | 380/23 |
| 4,509,093 | 4/1985 | Stellberger | 380/23 |
| 4,736,419 | 4/1988 | Roe | 380/23 |
| 4,786,900 | 11/1988 | Karasawa et al. | 380/23 |
| 4,837,822 | 6/1989 | Crosley et al. | 380/23 |
| 4,914,732 | 9/1990 | Henderson et al. | 70/63 |
| 4,988,987 | 1/1991 | Barrett et al. | 70/63 |

*Primary Examiner*—Salvatore Cangialosi
*Attorney, Agent, or Firm*—Laurence R. Letson

[57] ABSTRACT

A high security bolt lock is described having the ability to reencrypt the combination code for the lock each time a key is used and thus partially defeat the use of an unauthorized key. The lock may be operated by a temporary one time use key. The key for the lock carries a data storage means and battery to provide a date/time stamp and key identification for any key used. The key and lock may be coded to only allow access in a particular time block, or only in conjunction with an other key. The access to the lock may be controlled such that two keys must be used in a prescribed order to gain access through the lock.

17 Claims, 9 Drawing Sheets

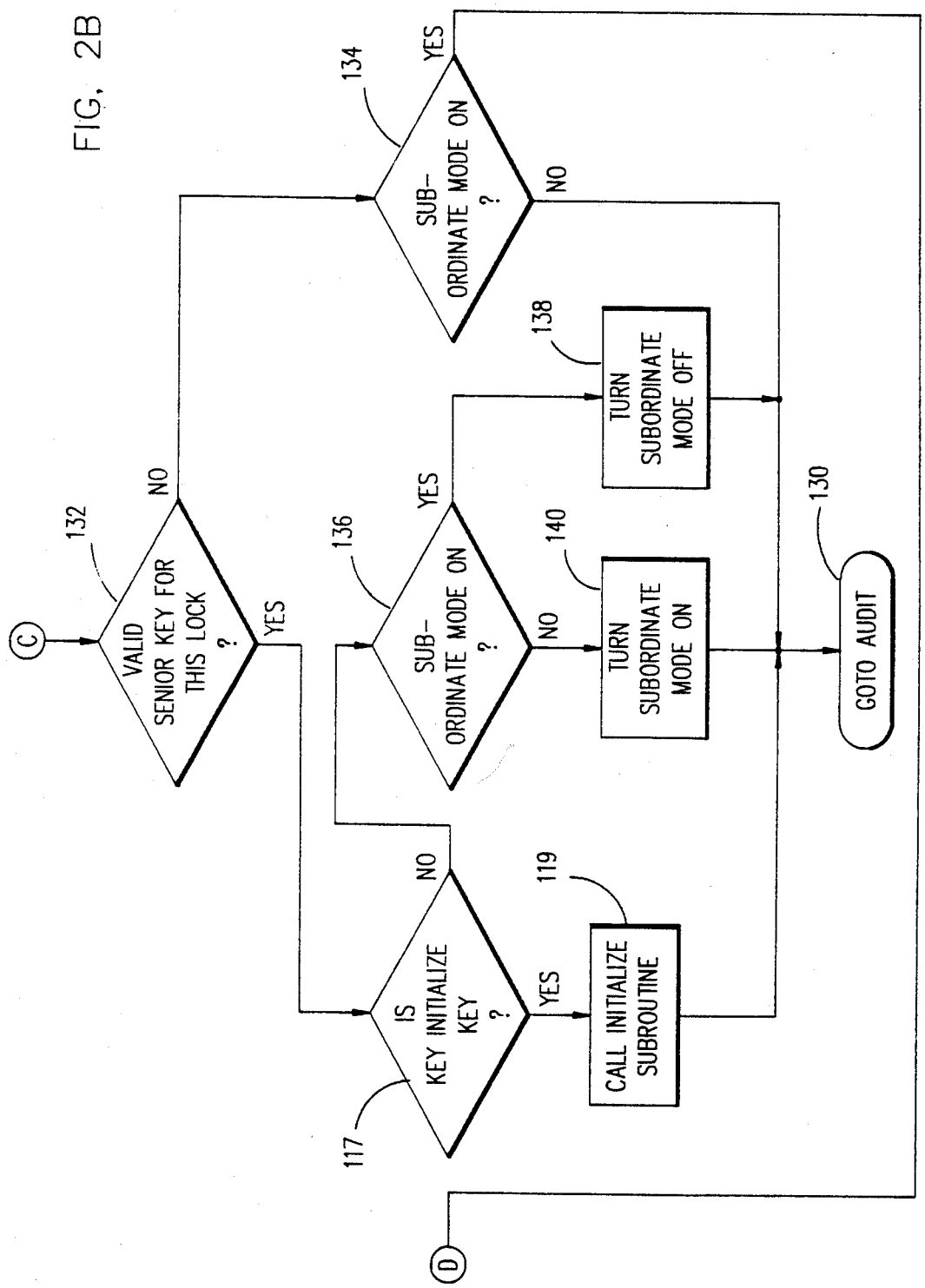

ELECTRONIC BOLT LOCK WITH ENHANCED SECURITY FEATURES

RELATED APPLICATION

The subject matter of this application is related to the subject matter of patent application Ser. No. 07/763,120 filed Sep. 20, 1991, on even date herewith by Gerald L. Dawson et al., entitled Bolt Lock Bolt Retractor Mechanism, and commonly assigned with this application to Mas-Hamilton Group, of Lexington, Ky.

FIELD OF THE INVENTION

This invention relates to bolt locks and, more specifically, to totally self-contained electronic bolt locks, having a magneto generator and enhanced security functions.

BACKGROUND OF THE INVENTION

Bolt locks have been the common means for locking doors in structures and securing other items for years, if not centuries. The locks have been purely mechanical until recently, when electronics have developed to the point of being usable in locks to perform the functions of authenticating the access codes and permitting entry.

With the advent of electronic control, the need for additional security features may be satisfied. In a mechanical bolt lock, there is no capability to determine during which part of a day or week the operator may be granted access. Access to a key by an unauthorized individual could result in the compromise of the lock by key duplication. Further, with mechanical locks, the duplication of a key permits unlimited access to the bogus key holder until the tumbler system is re-keyed to block out all prior keys. Although intended for one particular office lock, a key may fit and operate an unrelated house lock. Authorized individuals could not monitor operation of the lock nor establish key identity for each operation. If access is to be granted only when two individuals are present and that they each have a key, mechanical locks must be duplicated so that there are at least two locks on the enclosure. Mechanical bolt locks do not have the ability to permit a temporary key to be issued for a one time access and have the lock remain secure and deny access to that key on any subsequent attempt to open the lock. It is easily recognized that electronic bolt locks offer the opportunity to increase the level of security while offering other advantages.

These shortcomings of high security mechanical bolt locks provide opportunities to defeat the lock.

SUMMARY OF THE INVENTION

It is an object of the invention to provide an ability to change the access code of an electronic lock upon each use of an authorized key to unlock the lock.

It is an additional object of the invention is to permit access to the enclosure only when multiple keys are used to operate the same lock mechanism.

A further object of the invention is to permit the use of a temporary key to open the lock on a one-time basis.

It is an additional object of the invention to limit the use of a key to a defined group of locks.

It is another object of the invention to provide a limitation on the time of day during which a lock may be unlocked.

It is still another object of the invention to record the key identification and the time of operation to the lock.

It is a still additional object of the invention to locate the clock portion of an electronic lock in the key to enhance audit accountability.

SUMMARY OF THE INVENTION

The high security bolt lock of this invention has a self-contained electrical generator which is manually operated by the operator at the time of the operation of the lock to power the lock and its electronic controls. This feature allows the lock to be installed in remote locations and left unattended for long periods of time without the need to maintain a viable electrical power source connected to the lock at all times.

The lock is provided with a capability to recognize an access code only once; and thus, unauthorized duplication will not assure the individual of access to the lock on a continuing basis or, alternatively, the unauthorized access to the lock is known at the time the authorized key is next used. This is accomplished by the access code being rewritten in the key electronics after each access to the lock. The access code is comprised of a number, recorded or stored in a data storage memory device imbedded on the key. The data storage device is typically a nonvolatile EEPROM. As the access code is read from the key and compared to the authorized access code stored in the memory of the microprocessor in the electronic controls of the lock, the microprocessor generates an encrypted number which will be the access code for the next operation of the lock. This new access code is then written to the EEPROM of the key as well as the memory of the microprocessor of the electronic controls of the lock. If the key is duplicated and the duplicate is used prior to the authorized key, the authorized key will not operate the lock indicating to the authorized operator that the lock has been operated by an unauthorized key. This informs the lock owner or operator that there has been a overt entry. If on the other hand, the authorized key is used first, the access code is changed to prevent the use of any unauthorized access codes contained in any unauthorized key, which may have been acquired during duplication.

The incorporation of an electrical storage device of a large enough capacity to maintain the operation of the microprocessor clock module in operation permits the recording of data creating an audit trail of the date, time and key identity for each operation or attempted operation of the lock. The electrical storage device may be either a battery of the rechargeable or non-rechargeable nature or a capacitor. The clock module of the electronic chip on the key is operated to continuously update the date time module of the electronic controls. The lock electronic controls are programmable to allow operation of the lock only within designated time and date periods. Attempts to operate the lock at other times will be met with rejection of the access code and inability to operate the lock successfully.

Each lock may be classified as to the use of the lock. For example, a lock for use in a office would be classified in one category; a residence lock in a second category; a vehicle lock in a third category and other uses in other categories. A category code stored in the key is compared to the category of the lock and a key of one category will not be accepted by locks of another category; or the classes may be arranged in a hierarchy such that a key categorized to operate a lock of a selected category will operate any lock with a compatible combination in any lock of a lower-level security category. A category 2 key would be capable of opening a category 2 or 3 lock; a category 1 lock could be capable of operating all three categories of locks, assuming valid access codes for each lock. For example, a category 1 lock might be installed on a building entrance, a category 2 lock on a department entrance door, and a category 3 lock on an office door.

Each key may be provided with a unique identifying code such as a serial number, which may be accessed by the lock electronics when inserted in the lock. This key identification may be read from the key and stored in a nonvolatile memory of the lock along with the date and time, as each key is used to create an audit trail of all keys used to operate the lock, the date and time the lock was operated, the date and time of use, and also identification of the keys which were unsuccessful in opening the lock.

It may be desired to separately maintain the clock operation on a clock chip imbedded in the key. With battery power the clock data is kept current. When the key is removed from the lock, the date/time clock circuit is removed from the lock. Of course, the clock chip could be incorporated into the lock electronic controls resident within the lock.

The shortcomings of the prior art mechanical locks may be overcome by this invention and a better understanding of the invention may be had from the drawings and the following detailed description of the invention.

BRIEF DESCRIPTION OF THE DRAWINGS

FIGS. 2A, 2B and 2C comprise a representation of the operations of the lock electronics and particularly the microprocessor controlling the lock operation, presented as a control logic flow diagram.

DETAILED DESCRIPTION OF THE BEST MODE FOR CARRYING OUT THE INVENTION

Figure 1:
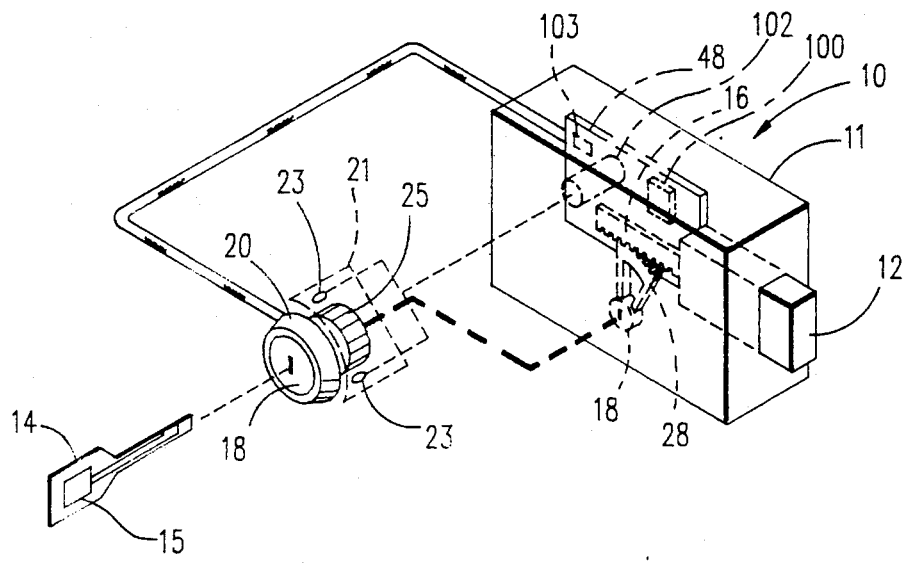
FIG. 1 illustrates a bolt lock of the type described herein in a diagrammatic fashion.

The fabrication of the bolt lock is shown in a diagrammatic fashion in FIG. 1 The key 14 may be inserted into the key cylinder 18 to operate the lock 10. Lock operation from the standpoint of generation of the electrical power necessary to power the lock, and from a mechanical standpoint, is described in U.S. patent application Ser. No. 07/763,120, filed Sep. 20, 1991, the same date as this application was filed by Gerald L. Dawson et al., entitled Bolt Lock Bolt Retractor Mechanism, and commonly assigned herewith to Mas-Hamilton Group, Lexington, Ky., and is incorporated herein by reference.

The operations of the lock 10 are controlled by the electronics control 48. This electronic control 48 incorporates the circuitry necessary to support a microprocessor 100 of the type manufactured and sold by OKI Electric Industries Company, Ltd. of Tokyo, Japan under designation 80C51F. The specific design of the circuitry is not shown since it is within the skill of the art of circuit design, given the information provided by the supplier of the microprocessor as regards the necessary support circuits for the microprocessor and the output circuits necessary to utilize the benefits of the microprocessor 100.

The control of the microprocessor 100 is provided by a program written specifically for this device and embedded in the memory portion of the microprocessor 100 or an associated memory storage device, if desired. The best mode of implementing this invention is through the use of a program to control the operations of the microprocessor 100; a person skilled in the art of programming may write a control program for the preferred microprocessor or any similar microprocessor manufactured by other companies, using the teachings and description contained herein together with the logic flow control illustrated in the drawings.

Figure 2A:
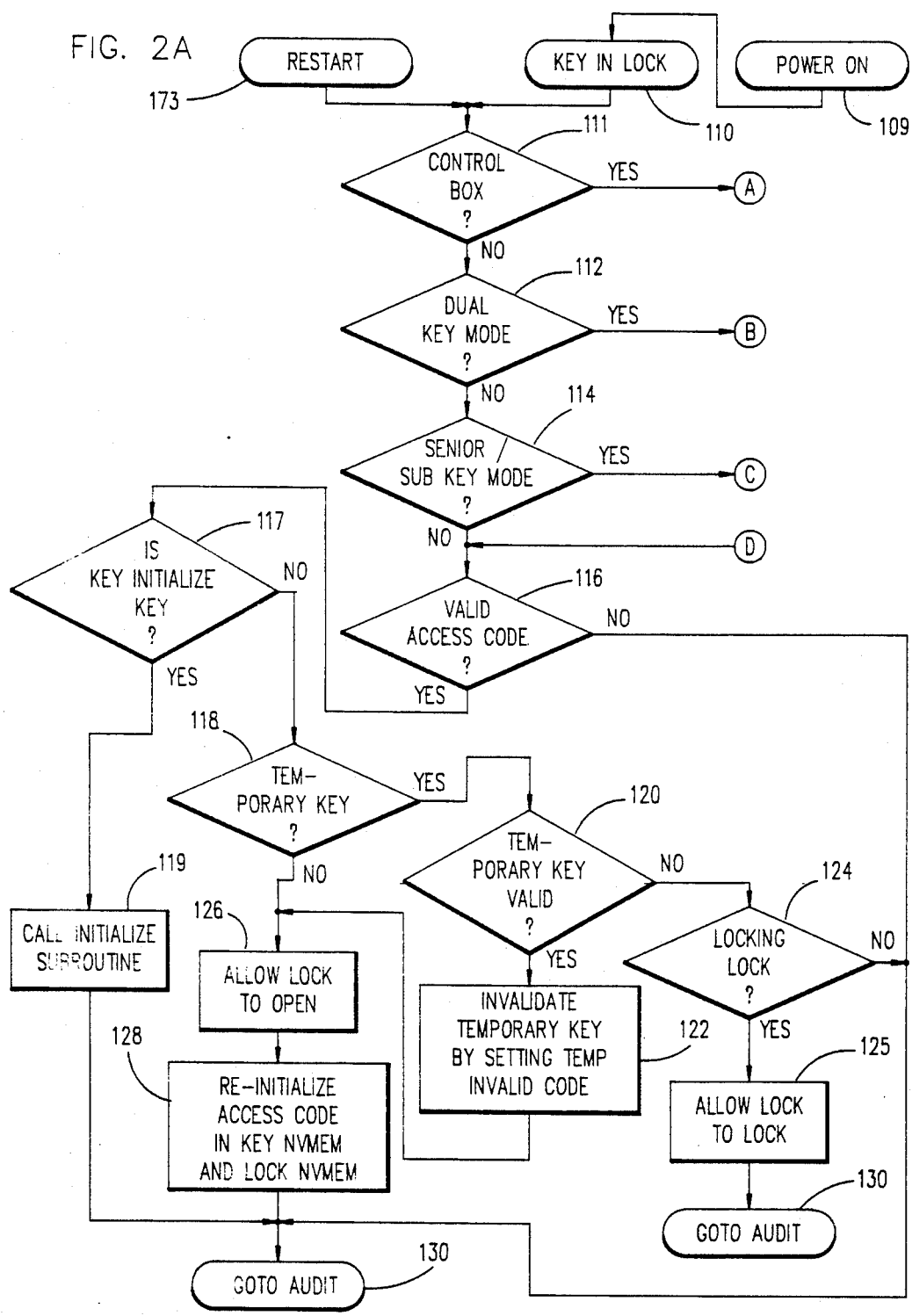
Figure 2C:
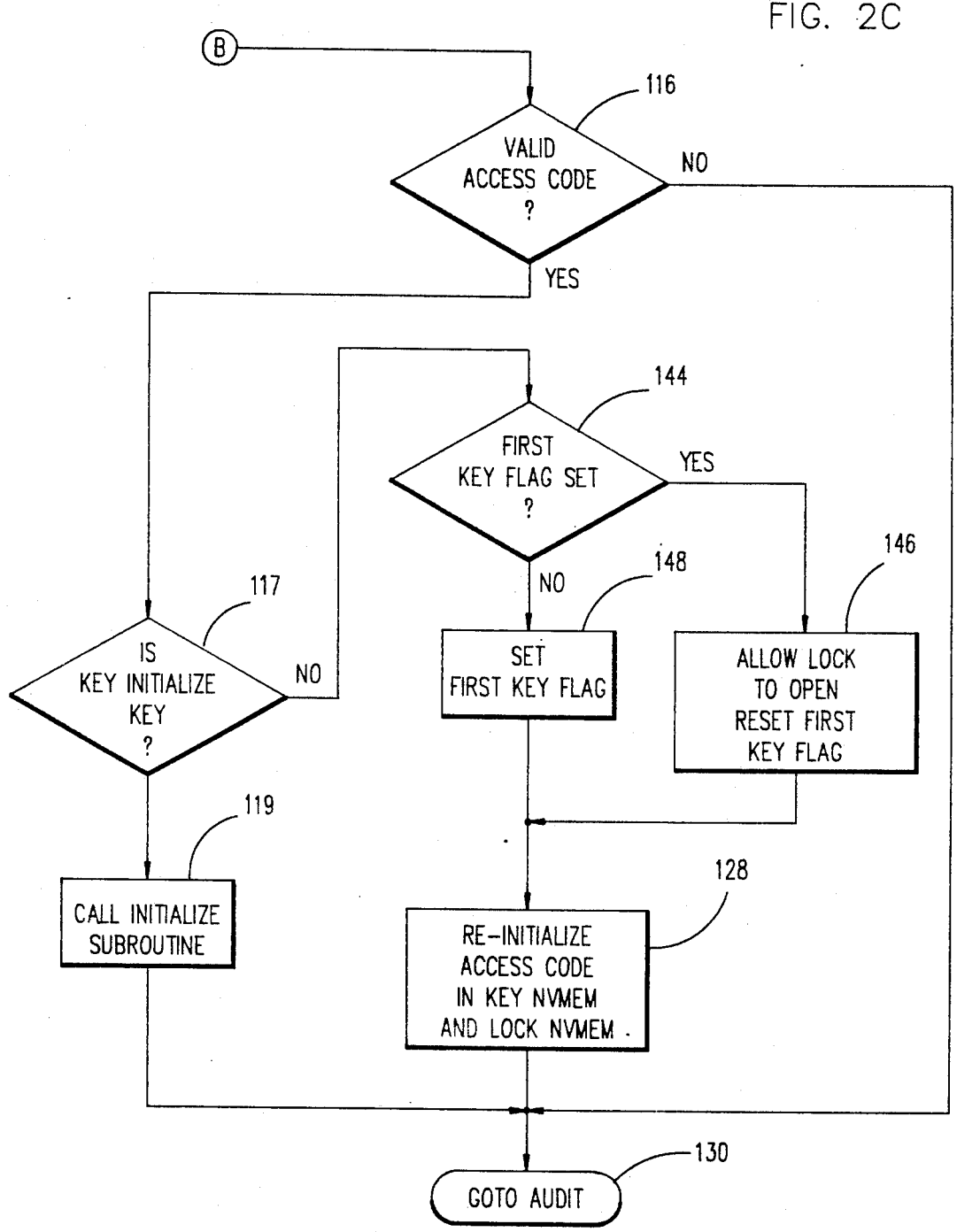

The control program is illustrated in and reference is made to FIG. 2 which comprises FIGS. 2A, 2B and 2C. Entering the flow diagram of FIG. 2A at operation 109, the lock 10 is powered by the generator 21 of FIG. 1, and the electrical energy is stored in capacitor 102. Capacitor 102 is sometimes referred to as a super cap due to the large capacitance and its ability to store a charge for a long period of time.

As the lock 10 is powered by the generator 21 and the capacitor 102, the key is electrically accessed to perform a battery check in operation 110. Operation 110 is expanded in FIG. 6, to be described below.

Thereafter, presence of an audit/initialization device is determined in operation 111 prior to the mode of the lock 10 being determined. In operation 111, a test is made to determine if the lock 10 has a control box or audit/initializer device of FIG. 11 attached. If so, the flow branches to FIG. 8. If not, the flow is to operation 112.

The mode of the lock 10 is determined by the condition of flag bits set within the microprocessor 100 memory. The setting of the mode may be accomplished at the time of manufacture or as described later. Thus the number of keys 14 and any relation between the keys 14 is determined by the setting of flag bits in the memory of the microprocessor 100. This may be accomplished by the mask configuration that is employed when the microprocessor 100 and its memory are manufactured or it may be accomplished by writing the appropriate flag bits into the memory of the electronic controls 48 during the lock 10 manufacturing process.

The first mode check is made in operation 112, where it is determined whether two keys 14 are required to open the lock 10. If the answer to this determination is in the negative, then a second mode check is made at operation 114 where it is determined if the lock 10 is conditioned for opening only with a senior/subordinate mode of operation. In the senior/subordinate mode of operation, a senior key must be inserted in the lock 10 and the lock 10 electrically powered. Then after the senior key has been used and validated, the lock 10 is conditioned to accept the subordinate key 14, as will be more fully described later.

The senior/subordinate mode of operation permits one person to grant or deny access by either validating the senior key or locking out all subordinate keys. If the senior/subordinate mode is not set, then the access code contained in the key 14 is checked for validity. This check in operation 116, FIG. 2A, determines the legitimacy of the stored numerical code. The checking step in operation 116 is expanded for a more thorough understanding in FIG. 3. The subroutine illustrated in FIG. 3 will be explained in more detail later.

Assuming for the sake of the discussion, at this point, that the access code is valid and so determined in operation 116, the lock 10 determines from the stored information in the EEPROM 15 whether the key 14 is an initialization key 14. If it is not such a key, the flow then branches to operation 118.

If on the other hand the key 14 is an initialization key, the flow is to operation 119 where the initialization subroutine is called. This subroutine will be described with reference to FIG. 9 later. The flow out of operation 119 is to point 130.

In operation 118, the key 14 which has been determined not to be an initialization key in operation 117 is tested to determine if the key 14 is a one-use, temporary, key 14 or a key 14 that is to be granted regular, continued access. If the key 14 is not a temporary key 14 as determined in operation 118, then the lock 10, in operation 126, is allowed to open by sending a signal to the lock enabling device such as the stepper motor 22 and associated parts of the co-pending, Gerald L. Dawson, et al., patent application referred to above. The lock 10 is enabled in operation 126 to accept the manual input from the operator to cause the bolt 12 to withdraw.

The access code contained in the EEPROM 15 on key 14 is then reinitialized, reencrypted and written into both the EEPROM 15 as well as the memory portion of the microprocessor 100 in operation 128. This subroutine will be further explained in conjunction with the flow diagram in FIG. 4.

Figure 5:
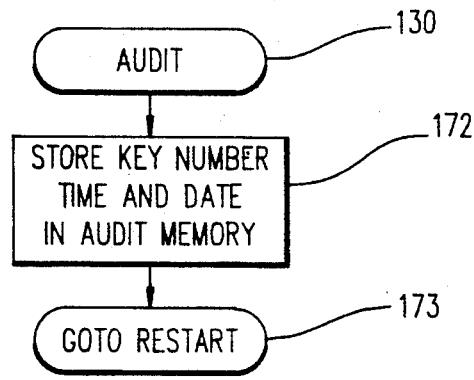
FIG. 5 is a flow diagram of the audit subroutine.

Upon the completion of the reinitialization and reencryption of the access code, in operation 128, the flow is to the subroutine 130 illustrated in expanded form in FIG. 5.

When the key 14 is determined to be a temporary key 14 in operation 118, the access code stored in the temporary key 14 is checked in operation 120 by reading the access code stored in the EEPROM 15 of the key 14 and comparing it with the code in the memory of microprocessor 100. If the codes compare, then the key 14 and particularly the access code stored therein are invalidated in operation 122, by the storing of a code indicating that the access code of the temporary key 14 is invalid and thus denying future access to the used temporary key 14. This may be accomplished in several ways. One such approach would block access to the memory location in which the access code is stored. This will prevent the storage of the reinitialized access code and if the key 14 is used again, the access code resident in the key EEPROM 15 will find no counterpart in the lock 10 and will thus prevent the flow through the operation 126, where the lock 10 may be enabled to be opened as described above.

An alternative approach to invalidating the access code of the temporary key 14 would be to set a bit in the memory of the microprocessor 100 to indicate that the access code for that key 14 may not be recognized as valid; or the access code rewritten to the EEPROM 15 could be a code that would not under any conditions be recognized as a valid access code. Other techniques will become apparent to one of skill in the art of programming which will prevent the temporary key 14 from being used to open the lock 10 after the temporary key 14 has been used for its intended one-time use.

When the temporary key 14 is determined not to be valid as it fails to contain an access code which matches the valid access code stored in the microprocessor 100 memory, in operation 120, the control flow branches to operation 124. In operation 124, a determination is made as to whether the key 14 is attempting to lock the lock 10 by extending the bolt 17. If the determination is that the lock 10 is open and the lock 10 is being locked, the flow is from operation 124 to operation 125 where the lock 10 is allowed to be locked and, thereafter, to point 130 which is the entry point to the audit subroutine of FIG. 5. As is seen from the path of the control flow, even though temporary key 14 has been invalidated for further use in opening the lock 10, the invalid temporary key 14 may be used to lock the lock 10 and the key 14 will be identified in the audit subroutine to be described later.

If the key 14 in the lock 10 is a temporary key 14 with an invalid access code and the determination of the activity of the temporary key 14 is that it is other than locking the lock 10, i.e., attempting to open the lock 10, then the logic control flow is directly to point 130 for entry into the audit subroutine to record the attempt to open the lock 10, as will be described later.

Figure 7:
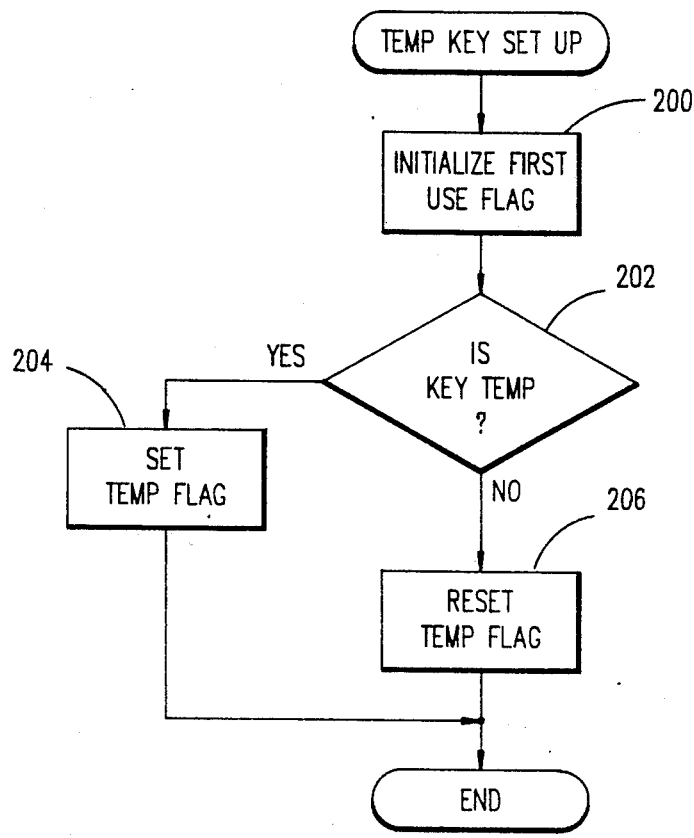
FIG. 7 illustrates in flow diagram form the temporary key setup subroutine.

In order for the lock 10 to accept any key 14, the key 14 must be first initialized. This initialization is illustrated in FIG. 7. The key 14 is initialized by setting the first use flag. The setting of the first use flag allows the key to communicate to the lock 10 that the key has never been used before and that there is no access code in the memory of the microprocessor 100. The setting of the first use flag is accomplished in operation 200. The flag is stored in the EEPROM 15 on key 14.

In order for the nature of the key 14 to be determined, a decision in operation 202 is made as to whether this key 14 is a temporary key 14. This information may be stored in the EEPROM 15 or may be input from the initialization device. The initialization device will be described later in reference to FIG. 11. At this point, suffice it to say that the initialization device is a computer 270 and input, such as a keyboard 272, and an interface 274 to connect to the EEPROM 15 to power the EEPROM 15 and to read and write to the memory locations therein. The initialization is the storing of data bits in predesignated addresses in the EEPROM 15. The computer 270 may also be connected to microprocessor 100 through interface 276, which may take the form of a key like member insertable into the key cylinder 18 to connect to the microprocessor ports therein.

In either case, regardless of the source of the information regarding the temporary nature of the key 14, if the key 14 is a temporary, the temporary key flag is set in the EEPROM 15, in operation 204. On the other hand, if the key 14 is not intended to be a temporary key 14, the temporary flag is reset in operation 206. After either operation 204 or 206, the initialization of the key 14 is complete.

Figure 8:
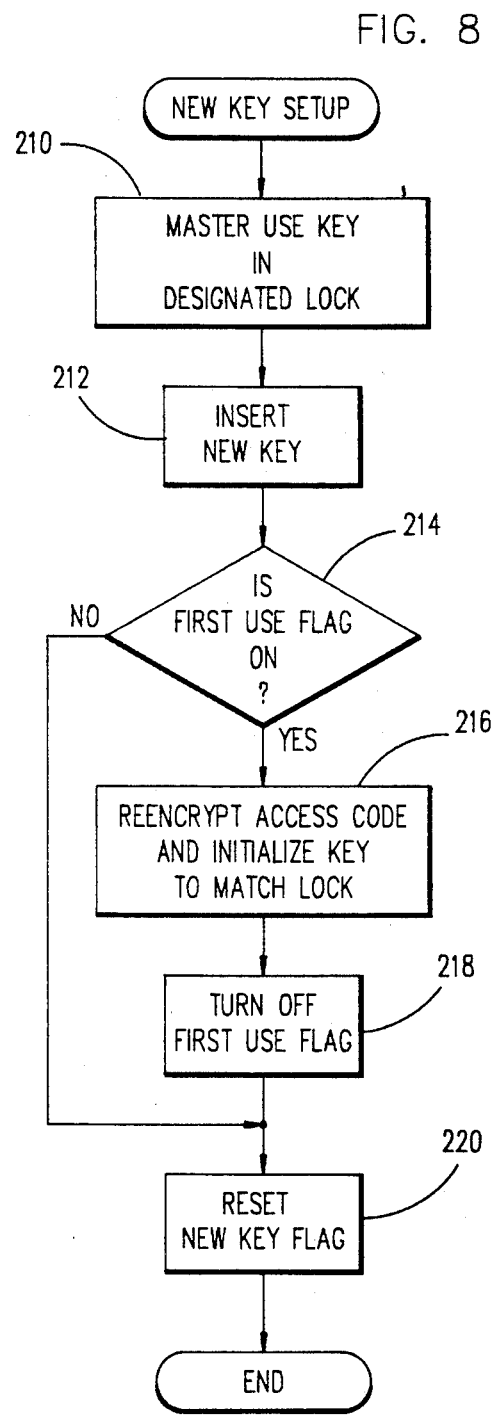
FIG. 8 shows in flow diagram form the subroutine for new key setup.

Referring now to FIG. 8, to complete the preliminary steps necessary to condition the lock 10 to accept any key 14 and particularly the temporary key 14, the lock 10 which is intended to be operated by the key 14 is conditioned by the insertion of a master conditioning key 14 which has an EEPROM 15, just as do the regular and temporary access keys 14. In the EEPROM 15 of the master conditioning key 14, 1 code is stored which when read and retrieved by the microprocessor 100 of the lock 10, causes the setting of a flag in the microprocessor 100 to cause the microprocessor 100 to treat the next key 14 inserted in the lock as a new key 14, when inserted in the lock 10 in operation 210. Thereafter, when the next key 14 is inserted in operation 212, a determination is made in operation 214 as to whether the first use flag is set. If the flag is set, the flow is to operation 216 where the access code of the key 14 is initialized by encrypting the serial number of the key 14 as stored in the EEPROM 15 through two levels of encryption, as described later herein, with reference to FIG. 4.

After the reencryptions of the access code and the storage of the reencrypted code in both the EEPROM 15 and the memory of the microprocessor 100 in operation 216 in FIG. 8, the first use flag is turned off or reset in EEPROM 15 at operation 218. Thereafter, the new key flag set in operation 210 is reset in operation 220. At this point the new key 14 is acceptable to the lock 10

If the first use flag is not on as determined in operation 214, the flow from operation 214 is directed to operation 220, and the flow progresses from that point. After operation 220 is complete, the routine is complete and ends. This subroutine may be inserted into the flow of FIG. 2A at any desired point but preferably resides between operations 110 and 111. However, this routine may be inserted at any desired point prior to operation 116.

Figure 9:
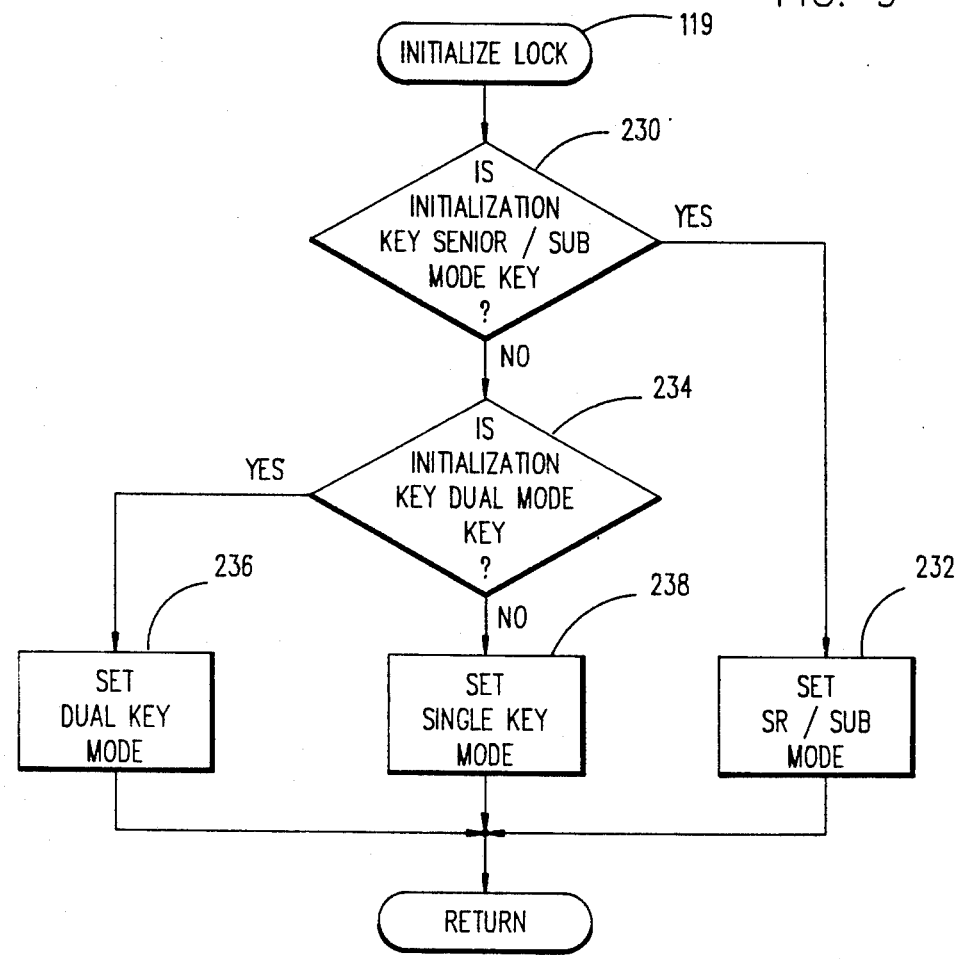
FIG. 9 illustrates the logic flow diagram of the lock initialization subroutine.

The initialization subroutine for initializing the lock in operation 119 is illustrated in expanded form in FIG. 9. When the subroutine is called in operation 119, the EEPROM 15 on key 14 is read and a determination is made to see if the key 14, inserted in the lock 10, is an initialization key 14 for the senior/subordinate mode of operation. The initialization key 14 will convey the operational mode of the lock 10 to the lock 10 and this information will be used by the microprocessor 100 to set a flag in the appropriate memory location of the microprocessor 100 causing the microprocessor 100 to function as in a particular mode of operation, depending upon which of the mode flags are set. One of skill in the art of programming microprocessors will clearly understand how a flag set in a particular location will control in which of alternative modes the microprocessor 100 will operate.

When the determination is made in operation 230 that the key 14 is a senior/subordinate mode initialization key 14, the senior/subordinate mode key 14 is set in operation 232. If, on the other hand, the key 14 is not a senior/subordinate mode key 14, the information stored in the EEPROM 15 is tested to determine if the information in the EEPROM 15 is determinative of a dual or two key 14 operation in operation 234.

When the initialization key 14 is a dual mode key 14 the dual mode flag is set in operation 236, causing subsequent operation of the lock 10 to be only in response to two designated keys 14.

If the the initialization key 14 is not a dual mode key 14, as determined in operation 234, then the single key mode flag is set in operation 238, permitting any one key 14 with a valid access code to open the lock. Thereafter and after operation 236 or 232 the logic control flow returns to the main program in FIGS. 2A, 2B or 2C, from which this subroutine was entered.

The conditioning of the lock to desired categories may be accomplished in the same manner, setting by inserting master category initialization keys into the lock 10 to set flags corresponding to the appropriate categorization for the lock 10. However the preferred method of categorization is to set the bits in the memory of the microprocessor 100 during the manufacturing process by use of masks or to set the appropriate category bits at the time of assembly and manufacture of the lock 10.

Figure 3:
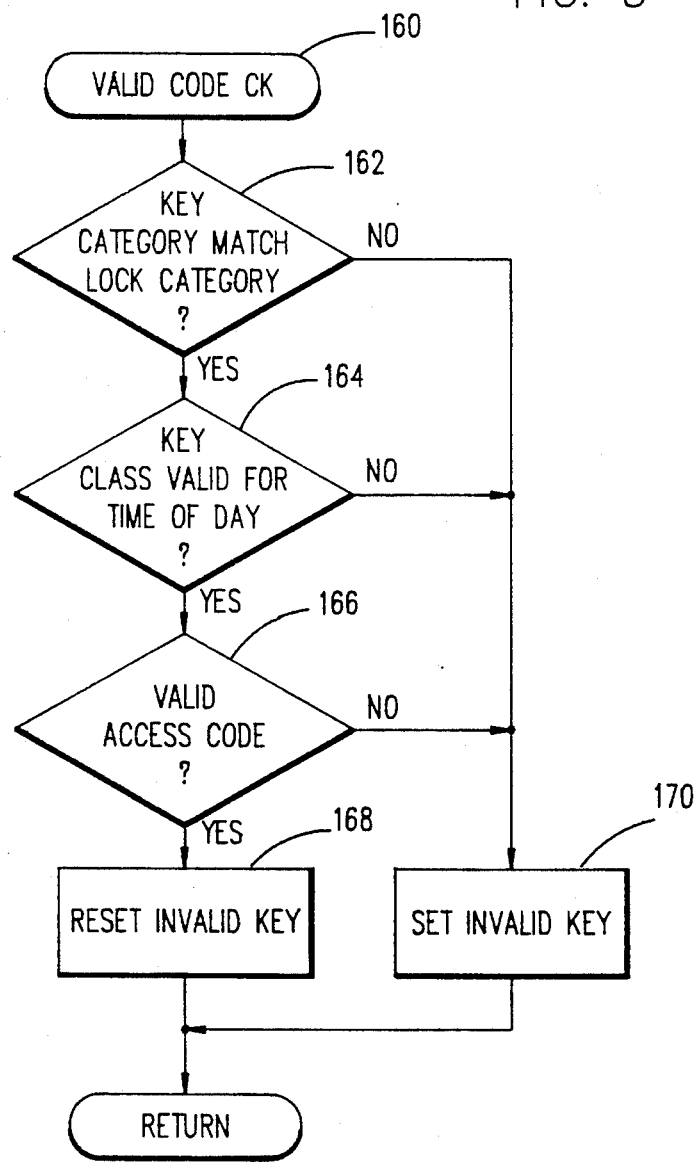
FIG. 3 is a flow diagram illustrating the access code validation subroutine.

At this point, operation 116 will be explained in its expanded form as shown in FIG. 3. The subroutine in FIG. 3 is entered at point 160 and the flow of the logic control is directly to operation 162 where the category code stored in the EEPROM 15 is read and compared with the category code of the lock 10. The category code must match that of the lock 10 or be of a higher ranking category. For example, a building entrance door lock may be a category 1, a departmental door lock a category 2, and an individual office door may be a category 3. A category 2 key would be capable of opening the departmental and office door since category 2 is higher than category 3, but not the main building door, thereby limiting access to the building only to those hours during which it was open for business.

Now referring back to the operation at 112 in FIG. 2A, if the mode of the lock 10 is that of requiring two keys 14 to be read and validated, the dual key mode, the flow is to FIG. 2C where the access code is checked to determine if it is a valid access code in operation 116. Operation 116, although shown here, is the same operation 116 as shown in FIG. 2A and as expanded and illustrated in FIG. 3.

If the access code is not valid, the remaining operations in FIG. 2C are bypassed and the flow is to operation 130.

When the access code is found to be valid in operation 116 of FIG. 2C, the flow is to operation 117 as shown in FIG. 2C. The flow of the logic from operation 117 is to either operation 119 or operation 144 where the First Key flag is checked in the memory of the microprocessor 100 to determine if one of the two keys 14 required to operate the lock 10 has been previously validated. Operations 117 and 119 have been described with regard to FIG. 2A previously and operations 117 and 119 are identical to the like numbered operations in both FIG. 2A and 2C.

Should the First Key flag not be set as determined in operation 144, then the First Key flag is set in the memory of the microprocessor 100 to indicate that the key 14 just validated is one key 14 of the two keys required to open the lock 10. Thereafter, the flow is to operation 128 in FIG. 2C where the access code is reencrypted and stored in the EEPROM 15 of the key 14 and also overwritten in the designated storage locations of the memory of the microprocessor 100. The access code is stored is nonvolatile memory which will retain the access code even when the power to the key 14 or lock 10 is no longer sufficient to operate the electronic controls 48 of the lock 10. The details of the operation 128 have been described with regard to FIG. 2A and are the same in FIG. 2C.

Upon the completion of the writing of the reencrypted code to the memory of the microprocessor 100, the control logic will progress to operation 130, which will be explained in conjunction with FIG. 5.

Referring back to operation 144, if the First Key flag is set as determined in operation 144, then the lock is conditioned to allow the lock to open and the First Key flag is reset, indicating that both keys necessary for authorized access have been validated and any further attempt to open the lock will require two authorized keys. From operation 146, the logic flow is to operation 128, previously described.

Should the dual key mode not be set in operation 112 of FIG. 2A and the senior/subordinate mode set as determined in operation 114, then the flow is to FIG. 2B and operation 132 where the access code for the key 14 is checked performing the same steps and operations of FIG. 3 for the senior access code as stored in the memory of the microprocessor 100. If the access code of the key 14 is determined to be the proper valid code for the senior key 14, then the flow is to operations 117 and 119 or from operation 117 branching to operation 136. Operations 117 and 119 have been previously described with reference to FIG. 2A.

When the key 14 is not an initialization key 14, as determined in operation 117, the the state of the subordinate mode is determined by checking whether a subordinate mode flag is set "ON" in operation 136. If the result of operation is 136 is negative, then the subordinate mode is set ON in operation 140 and the flow progresses to operation 130. If, on the other hand, the result of the inquiry in operation 136 is affirmative, then the subordinate mode is turned "OFF" in operation 138. This series of alternatives act to toggle on and off the subordinate flag depending upon its state. The toggling of the subordinate mode flag controls whether the subordinate key 14 may operate the lock 10. For example, when the senior key 14 is used and checks valid and the subordinate mode is off, it is turned on to allow the subordinate key 14 to unlock the lock 10. However, if the subordinate mode is on, then the lock 10 has already been conditioned to allow the subordinate key 14 to unlock the lock 10; and when the senior key 14 is used, it toggles the mode to prevent the subordinate key 14 from operating the lock 10. This allows the senior key 14 to lock the lock 10 and lock out all subordinate keys 14, until such time as the senior key 14 is again used to open the lock 10.

Should the check in operation 132 be negative, and the subordinate mode be on as determined in operation 134, this indicates that the senior key 14 has already been verified and that this key 14, if it contains a valid access code, should be permitted as a subordinate key 14 to unlock the lock 10. Accordingly, the control logic flow is directed to operation 116 in FIG. 2A where the logic controls treat the key 14 as if the operation of the lock 10 is conditioned for single key 14 operation.

To expand the operation and understanding of operations 116 and 132, reference is made to FIG. 3. Operations 116 and 132 have the same steps except that the access code tested is selectively tested against the senior key access code in operation 132. Entry to the subroutine is at point 160. The first operation 160 in the subroutine is to check the category code stored in the EEPROM 15 on the key 14. The category code stored in the EEPROM 15 must match the category of the lock 10, as stored in the memory portion of the microprocessor 100. If the category of the key 14 and the lock 10 is not a match or the category code on the key 14 not have a numerical value of less than or equal to that stored in the lock 10, then the microprocessor operations will set an invalid key flag in the memory of the microprocessor 100 in operation 170 and then return to the logic operations from which the branch originated. If on the other hand, the code meets the criteria of the decision in operation 162, the flow is along the affirmative path to operation 164.

In operation 164, the class of the key code stored in the EEPROM 15 is compared to the class code of the lock 10. The class is a code indicative of a time block within which the key 14 is permitted to operate the lock 10. If the class of the key 14 is matched to the class of the lock 10, then the operational flow is to operation 166. If on the other hand the class does not match with the lock 10, the flow is to operation 170 which has been described earlier.

In operation 166, the combination code or unique code number to open the lock 10 is compared to the stored combination code in the memory of the microprocessor 100. If the two codes do not match exactly, the invalid key flag is set in operation 170. Of course if the codes do match, in operation 166, the valid key code flag is set in the memory of the microprocessor 100 and the operational control is returned to the point in the main flow in FIGS. 2A, 2B or 2C, from which the flow branched to operation 160.

Figure 4:
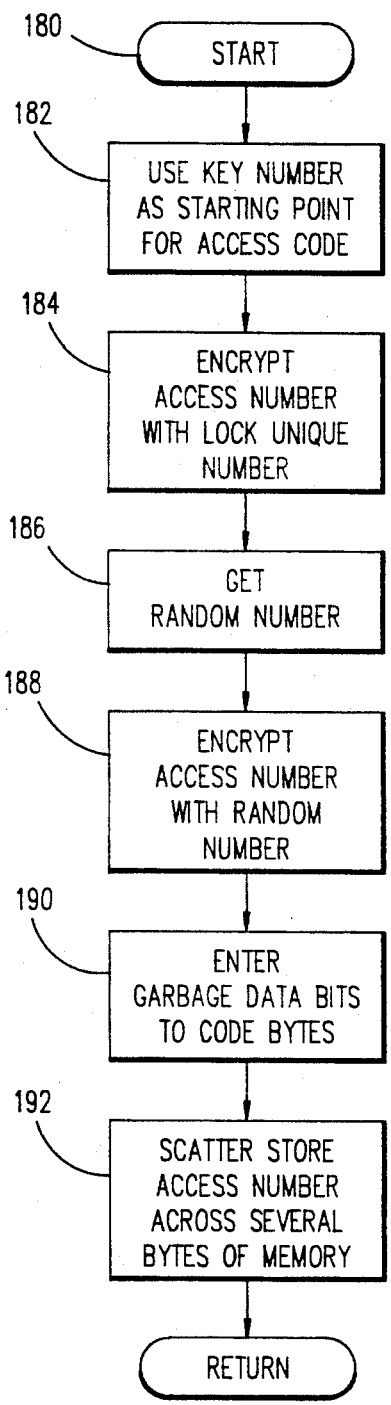
FIG. 4 is a flow diagram showing the reencryption subroutine.

Referring to FIGS. 2A and 2C, operations 128 are identical in their structure and flow. Both operations 128 are presented in expanded form in FIG. 4. Entry into the subroutine of FIG. 4 is the starting point 180 where the flow is to operation 182. In operation 182, the key identification number is accessed from the EEPROM 15 of key 14 and the key identification number is used as the starting point or value for re-encryption of the access code for the lock 10.

The access code is set equal to the key identification number in operation 182 and then encrypted by mathematical manipulation, such as multiplication, division, addition, subtraction or combinations thereof, using a lock unique number such as the lock serial number, by way of example, in operation 184.

In operation 186, once this encryption of the key identification number has occurred, the microprocessor 100 generates a random number within preset limits. The encrypted number resulting from operation 184 is further encrypted using the random number generated in operation 186.

After the encryption step in operation 188, the resulting encrypted code is camouflaged by the insertion of spurious data bits into other bit locations in multiple bytes, in operation 190. These spurious bits may be referred to as garbage bits. The spurious bits may be inserted into the encrypted code by placing the spurious bits into several locations in a larger number of bytes in operation 190. This makes room for the encrypted access code bits in predetermined bit locations of the bytes in operation 192. For example, an eight bit access code may be scattered two bits into each of four bytes and the remaining six bit locations of each byte filled with garbage bits.

After the twice encrypted access code is altered further by the insertion of spurious or garbage bits into the code bytes, the code bytes are then stored across several bytes of memory in the microprocessor 100 and in the EEPROM 15 of key 14.

Since the two codes are stored from the same series of code bytes, when the encrypted access code is retrieved from the memory of the microprocessor 100 and from the EEPROM 15 on key 14, they are identical. Since identity is the quality required to unlock the lock 10, there is no need or advantage to de-encrypt the access code. The access code is not a cumulatively used value because the reencryption of the access code always starts over with the successful opening of the lock 10 with a correct access code and the next access code does not depend in any way upon the prior access code.

Figure 10:
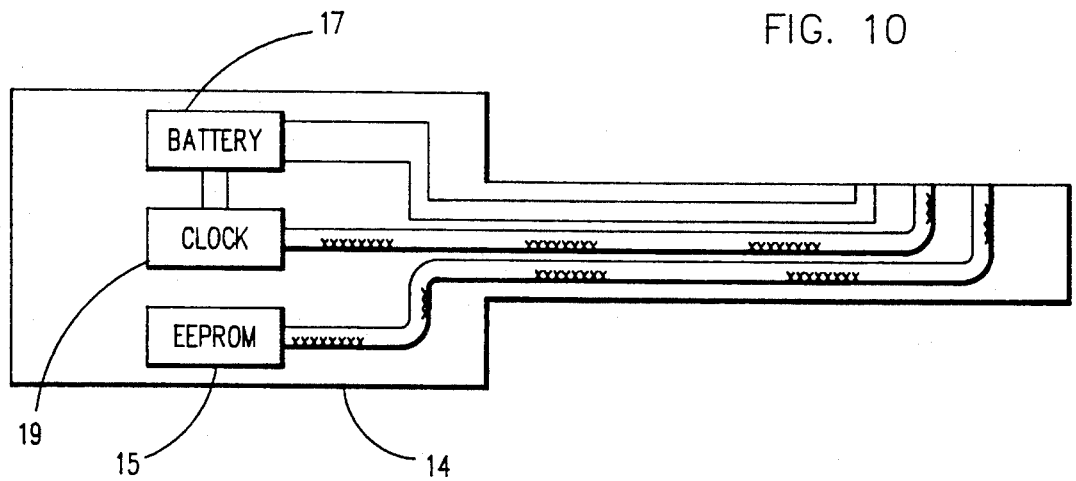
FIG. 10 shows an example of a key for use in the invention.

Referring now to FIG. 10, the key 14 may include a battery 17 of long life characteristic which powers a clock module 19. This clock module 19 provides a continuously updated date and time signal; the date/time signal is used for purposes of the class code comparison described above.

An alternative to the battery 17 and the clock module 19 residing on the key 14 is to include the clock in the electronic controls 48 of the lock 10. An electrical storage device such as a capacitor of large capacitance and very slow leakage rate, sometimes referred to as a "super cap," such as manufactured and sold by Matsushita Corporation under the designation of Panasonic Gold Cap, is used to sustain clock operation and may be recharged by the operation of the lock 10, through rotation of the generator 21. In some environments, electrical operating power may be supplied to the lock 10 from a main power source over wires or cables.

Also stored in the EEPROM 15 on the key 14 is a number identifying the key 14. This identification number may then be accessed for key identification. The key identification number may be used, for example, in the audit subroutine illustrated in FIG. 5. The audit subroutine collects data which may then be later unloaded to provide an audit trail to identify the keys that were used to unlock the lock 10, lock the lock 10 or unsuccessfully attempt to unlock the lock 10. The audit subroutine further records the accessing of the audit data. Operation 172 in FIG. 5 collects the key identification code number from the EEPROM 15 of key 14 and stores it along with the date and time in the nonvolatile memory of the microprocessor 100. From the subroutine in FIG. 5, the flow is to the restart point 173 where the main flow control is reentered so that the operation of the lock electronic controls 48 will continue, as with the use of two keys 14 or when the key 14 is invalid. The electronic controls 48 then stand ready for the insertion of any key 14 and an attempt to open the lock 10 with the newly inserted key 14. This collection of data will provide the lock owner with a record of which keys were used and at what time and date the keys were used to attempt to operate the lock 10, whether successful or unsuccessful. This will allow the owner to determine if people opened the enclosure at times of interest to the lock owner as well as identification of keys that were used to unsuccessfully access the enclosure.

When all the conditions of category, class and access codes have been satisfied, and the lock 10 is conditioned for opening, as in operations 125, 126 or 146, in FIGS. 2A and 2C, the access is permissive. The opening of the lock 10 does not occur as a result of these operations, but rather, allows the operator to rotate the key cylinder 18 to operate the internal mechanical elements of the lock 10.

In a lock such as disclosed and described in Co-pending application by G. L. Dawson et al., entitled Bolt Lock Retractor Mechanism, Ser. No. 07/763,120, filed Sep. 20, 1991, and incorporated herein by reference, the key 14 is free to rotate for purposes of generating the operational voltage required to power the lock 10 and when the lock 10 is enabled for opening, the key 14 is then pushed to engage the key cylinder 18 with the sector gear 28.

Figure 6:
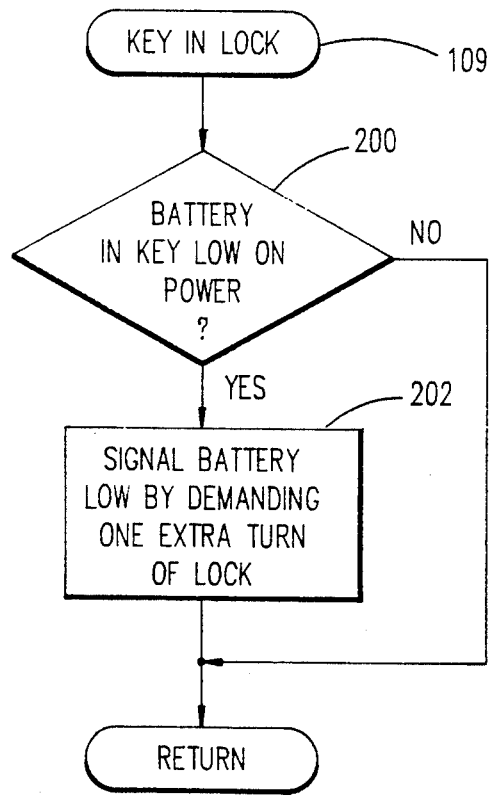
FIG. 6 is a flow diagram of the subroutine for testing the battery of the key to determine a low voltage condition.

This drive arrangement is particularly advantageous with respect to the capability of the lock electronic controls 48 to detect the voltage level of the battery 17 of key 14. Referring to FIG. 6, the microprocessor 100 is capable of monitoring the voltage level of the battery 17 on the key 14. When the key 14 is inserted in the lock 10, of necessity, the key 14 will make electrical contact with the input and output ports of the microprocessor 100 to allow reading the stored access code and key identification codes. In a similar manner, the microprocessor 100 may be placed in indirect contact with the terminals of the battery 17, through an analog to digital converter 103 of conventional design that converts the analog voltage reading into a digital signal compatible with the microprocessor 100. When the contact is made, the voltage sampled and determined to be less than the required voltage specified as a threshold for a low battery voltage indication in operation 200, the microprocessor 100 acts to set a condition requiring one or more additional turns of the key 14 to effect the withdrawal of the bolt 12. While the bolt 12 will be normally withdrawn with no more than one complete rotation of the key 14, the operation of the enabling drive chain permitting bolt 12 withdrawal may be delayed until the microprocessor 100 senses at least one additional complete rotation of the key 14 and the key cylinder 18. Upon the completion of the additional rotations of the key 14, the enabling drive chain is then activated.

The failure of the lock 10 to withdraw the bolt 12 in a normal manner prompts the operator to turn the key 14 an additional turns. Through knowledge of the operation of the lock 10, the operator will then recognize that the battery voltage is low; and while still sufficient to operate the lock 10 for a limited number of times, the battery 17 and key 14 are in need of replacement. The alternate approach is to allow the battery 17 to be replaceable. The cost of the EEPROM 15 on the key 14 is not insignificant; and until such time as it becomes an insignificant cost, it may be preferable to replace only the battery 17. Batteries are available which would keep the clock 19 active for more than a year at a time.

Figure 11:
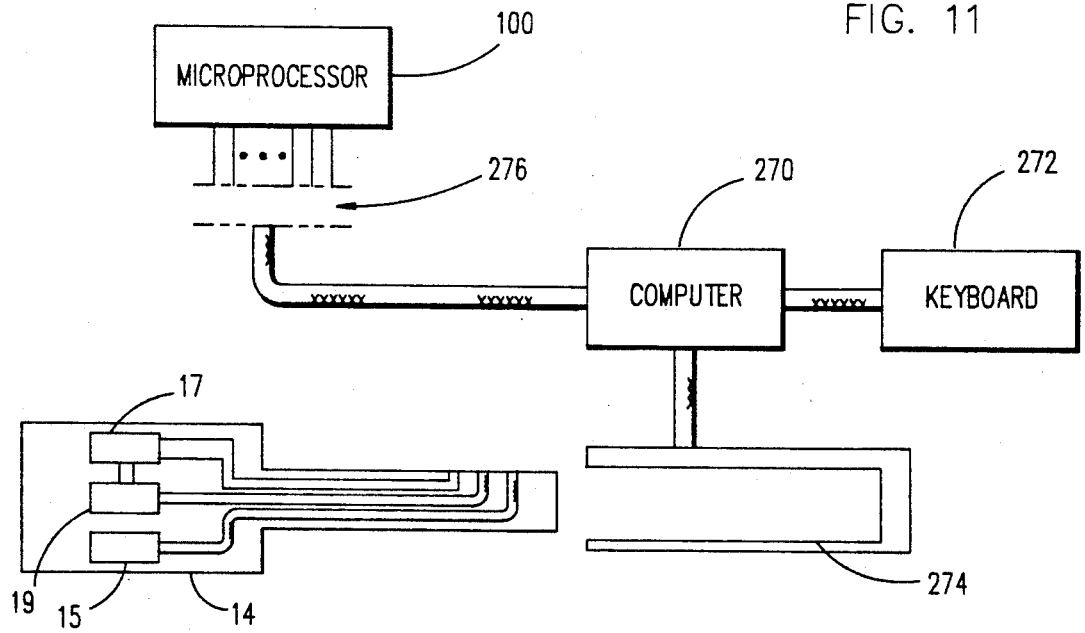
FIG. 11 is a diagrammatic illustration of an initialization device, for initializing the lock and key.

The initialization of the lock 10 may also be accomplished by the use of an audit/initialization device, illustrated in FIG. 11. Computer 270 is provided with an input device 272 such as a keyboard 252. This allows operator control and selection of operations and the inputting of information as needed to control the operation of the computer 270. Computer 27 50 may be a microprocessor, a personal computer or a mainframe. If the computer is a personal computer or a mainframe, the locks 10 would need to be connected to the computer 270 by permanent wiring links to access the microprocessor 100 in each lock 10. On the other hand, if the microprocessor version of computer 250 is used, it lends itself to portability and use on location at the lock site. Computer 270 is provided with an interface 276 for connection with the lock 10. In the case of a portable unit, the interface 276 may take the form of a key like member insertable into the lock 10 to make contacts with the input/output interface of the microprocessor 100, which would normally engage key 14 to permit access to the contents of EEPROM 15. The portable device preferably is provided with a key like termination on the end of an umbilical cord. The key like termination is the interface 254 to the lock 10

Figure 12:
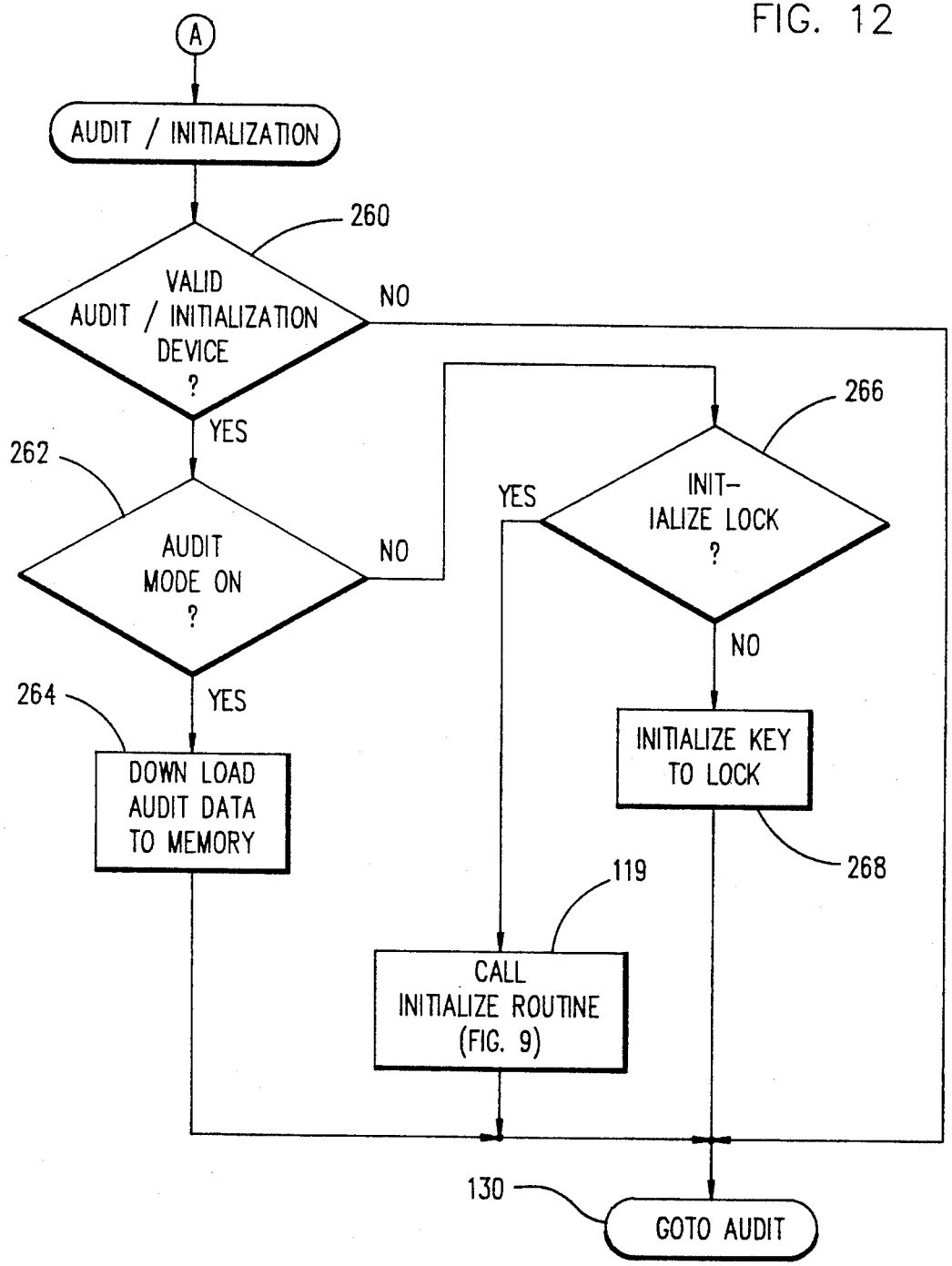
FIG. 12 shows the routine for acquiring the audit data stored in the lock memory and for initializing the lock.

The microprocessor 100 of the lock 10, in operation 111 in FIG. 2A, determines if the device in the key cylinder 18 is an audit/initialization device. Assuming an affirmative result, the subroutine in FIG. 12 is called and the device tested to determine if the device is legitimate for the control and operation of that lock 10 in operation 260. If the device is determined as a valid for use with that lock 10, the audit mode of operation is tested to determine if that mode is "ON", in operation 262. Upon an affirmative determination in operation 262, the audit data stored in the microprocessor 100 memory is read and stored in the memory of the audit-/initialization device and the flow is to the "goto audit" step in operation 130, previously described, where the audit operation will be recorded in the memory of the microprocessor 100.

If, on the other hand, the audit mode is not "ON" in operation 262, the flow branches to operation 266, to determine if the device is set to initialize the lock 10. If so, the initialization routine illustrated in FIG. 9 is called at operation 119 and, thereafter, the flow is to step 130.

When the determination in operation 266 is negative, the the operation 268 to be performed is to initialize the key 14 to the lock 10 and set the appropriate category and class data in the EEPROM 15 of key 14. This may be accomplished by inserting the key 14 into a key slot/interface 276 in the audit/initialization device. Then the category of the lock 10 may be read from the lock 10 and recorded in the EEPROM 15 on the key 14. The key 14 is set then to have a compatible category code to allow access to that lock 10. The clock 19 on the key 14 may likewise be set from the audit/initialization device, in an analogous manner.

The setting of the class may be through the keyboard 27 and the microprocessor 270, by entering the appropriate time/day data necessary to set the time period of access.

An alternative to the key and lock initialization would be to set the initialization data at the time of manufacture or at shipment. While an alternative, this would require a significant expense and time delay as, in effect, all locks would have to be custom ordered to be compatible with existing keys and categories of locks that the lock owner would already possess.

While the invention has been described using the aid of flow diagrams, it will be appreciated that the preferred embodiment of the best mode for carrying out the invention is a control program controlling a microprocessor to make the necessary decisions and perform the necessary steps, described above, to control operation of the lock and access to the enclosure. With the flow diagrams contained herein, and ordinary skill in the art of programming, a detailed control program may be prepared for the microprocessor of choice that will perform the operations required of the invention. It will be further appreciated that some of the operations may be placed in different order as the order of the steps may not be necessarily that order described herein; also the operations described herein may be subdivided or combined with other operations, as desired and as best utilized by the microprocessor of choice. The preferred microprocessor for implementing the best mode of carrying out the invention is the 80C51F by OKI Electric Industries Company, Tokyo, Japan.

It will also be understood that changes may be made in the implementation of the invention without departing from the scope of the invention as set forth in the claims.

We claim:

1. An electronic bolt lock comprising:
a bolt;
electronic controls;
internal, self contained electrical power generating means for electrically powering said electronic controls;
a key cylinder;
a key insertable into said key cylinder and comprising a data storage means for storing at least a code for accessing and opening said lock;
means connectable to said key cylinder to withdraw said bolt;
said electronic control means further comprising means for creating a new access code and encrypting said code upon each successful operation of said lock;
means for storing a unique identifier for said key in said key;
means for storing a unique identifier for said lock in said lock;
said means for creating and encrypting further comprising means for encrypting said key identifier as a step in said encrypting;
means for storing said new access code in encrypted form in both said lock and said key for use in accessing said lock on the next operation of said lock by said key.

2. The electronic bolt lock of claim 1 wherein said electronic controls further comprise means for determining the validity of a plurality of keys and access codes carried thereon.

3. The electronic bolt lock of claim 2 wherein said means for determining further comprises means for determining the order of validation of said plurality of said keys.

4. The electronic bolt lock of claim 1 wherein said electronic means comprises means for determining the presence of a one time use key, and means for validating said one time use key a single time and for invalidating all future use of said one time use key.

5. The electronic bolt lock of claim 1 wherein said electronic controls further comprises means for acquiring and storing data representing the identity of said keys inserted into said lock to attempt to operate said lock.

6. The electronic bolt lock of claim 5 wherein said means for acquiring and storing further comprises means for acquiring and storing data representing the time and date of the insertion of said keys.

7. The electronic bolt lock of claim 1 wherein said means for creating said new access code and encrypting said access code, performs at least two encryption steps using at least a separate and distinct number for each encryption step.

8. The electronic bolt lock of claim 1 wherein said key comprises a battery and means, responsive to electrical energy form said batter for maintaining a record of the date and time.

9. The electronic bolt lock of claim 8 wherein said lock comprises means for reading said record from said key.

10. The electronic bolt lock of claim 9 wherein said bolt lock comprises means for recording at least the date and time of use of said key, in said lock.

11. The electronic bolt lock of claim 10 where in said key further comprises data stored in said data storage means corresponding to groups of locks which said key may activate.

12. The electronic bolt lock of claim 11 wherein said lock comprises electronic controls comprising storage memory, and said storage memory contains data identifying said lock as a member of a group of locks, and said electronic controls further comprises means for comparing said data stored in said data storage means of said key with said data indentifying said lock, and permiting operation of said lock only when said data stored compares favorably to said data identifying said lock.

13. The electronic bolt lock of claim 8 wherein said electronic controls further comprise analog to digital conversion means for converting the voltage of said battery to a digital signal.

14. The electronic bolt lock of claim 13 wherein said electronic controls further comprises means for enabling said lock to open in response to rotation of said key within said lock, and means means for comparing said digital signal to a value of predetermined magnatude and means for signaling a battery low condition.

15. The electronic bolt lock of claim 14 wherein said means for signaling a battery low condition comprises means for delaying operation of said means for enabling until a predetermined condition has occurred.

16. The electronic bolt lock of claim 15 wherein said predetermined condition comprises a rotation of said key.

17. The lock of claim 1 wherein said means for encrypting said key identifier comprises an algorithm utilizing said unique identifier of said lock in which said key is used.

* * * * *